(12) United States Patent
Pearce et al.

(10) Patent No.: US 8,370,160 B2
(45) Date of Patent: *Feb. 5, 2013

(54) METHODS AND APPARATUS FOR IMPLEMENTING DISTRIBUTED MULTI-MODAL APPLICATIONS

(75) Inventors: Michael D. Pearce, Barrington, IL (US); Jonathan R. Engelsma, Hudsonville, MI (US); James C. Ferrans, Wheaton, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1430 days.

This patent is subject to a terminal disclaimer.

(21) Appl. No.: 11/967,356

(22) Filed: Dec. 31, 2007

(65) Prior Publication Data

US 2009/0171659 A1   Jul. 2, 2009

(51) Int. Cl.
*G10L 21/00* (2006.01)
(52) U.S. Cl. .................... 704/270.1; 704/275
(58) Field of Classification Search ............ 704/257, 704/270.1, 275
See application file for complete search history.

(56) References Cited

U.S. PATENT DOCUMENTS

| | | | |
|---|---|---|---|
| 6,185,535 B1 * | 2/2001 | Hedin et al. ............... 704/270 |
| 6,269,336 B1 * | 7/2001 | Ladd et al. ............... 704/270 |
| 6,633,846 B1 * | 10/2003 | Bennett et al. ........... 704/257 |
| 6,785,654 B2 * | 8/2004 | Cyr et al. ............... 704/270.1 |
| 7,003,462 B2 | 2/2006 | Shambaugh et al. |
| 7,016,845 B2 * | 3/2006 | Vora et al. ............... 704/270.1 |
| 7,200,559 B2 * | 4/2007 | Wang ....................... 704/257 |
| 7,254,542 B2 * | 8/2007 | Dames et al. ............ 704/270.1 |
| 7,809,575 B2 * | 10/2010 | Ativanichayaphong et al. ............ 704/270 |
| 7,945,851 B2 * | 5/2011 | Cross, Jr. et al. ............ 715/223 |
| 2003/0182622 A1 * | 9/2003 | Sibal et al. ................. 715/511 |
| 2004/0128136 A1 * | 7/2004 | Irani ....................... 704/270.1 |
| 2004/0138890 A1 | 7/2004 | Ferrans et al. |
| 2004/0220810 A1 * | 11/2004 | Leask et al. ............. 704/270.1 |
| 2006/0146728 A1 | 7/2006 | Engelsma et al. |
| 2006/0235694 A1 | 10/2006 | Cross et al. |
| 2006/0248207 A1 * | 11/2006 | Olson et al. ............... 709/230 |

FOREIGN PATENT DOCUMENTS

| | | |
|---|---|---|
| WO | 03071422 A1 | 8/2003 |
| WO | 2004006131 A1 | 1/2004 |

OTHER PUBLICATIONS

PCT Notification of Transmittal of the International Search Report and the Written Opinion of the International Searching Authority, or the Declaration, mailed Jan. 3, 2010, pp. 1-12, PCT No. PCT/US2008/086953, European Patent Office, P.B. 5818 Patentlaan 2, Nl - 2280 Hv Rijswijk.

* cited by examiner

*Primary Examiner* — Talivaldis Ivars Smits
*Assistant Examiner* — Shaun Roberts

(57) ABSTRACT

Embodiments include methods and apparatus for synchronizing data and focus between visual and voice views associated with distributed multi-modal applications. An embodiment includes a client device adapted to render a visual display that includes at least one multi-modal display element for which input data is receivable though a visual modality and a voice modality. When the client detects a user utterance via the voice modality, the client sends uplink audio data representing the utterance to a speech recognizer. An application server receives a speech recognition result generated by the speech recognizer, and sends a voice event response to the client. The voice event response is sent as a response to an asynchronous HTTP voice event request previously sent to the application server by the client. The client may then send another voice event request to the application server in response to receiving the voice event response.

21 Claims, 6 Drawing Sheets

METHODS AND APPARATUS FOR IMPLEMENTING DISTRIBUTED MULTI-MODAL APPLICATIONS

TECHNICAL FIELD

The inventive subject matter generally relates to distributed applications, and more particularly to distributed multi-modal applications implemented in a client-server system environment.

BACKGROUND

A user interface "modality" may be defined as a mode of interaction between a user and an electronic device, where the interaction is implemented through the device's user interface. A user interface modality may be implemented through a combination of hardware and software associated with a particular type of human perceptible information (e.g., information perceptible by sight, sound or touch) and/or human-generated information (e.g., information generated through speech or other physical action). For example, one type of user interface modality is a "visual modality," which may be implemented through a display screen and associated hardware and software for generating visual displays on the display screen. A visual modality also may be implemented using various input devices that facilitate user interaction with a visual display, such as input devices that enable the user to select information that is rendered in the visual display (e.g., using a scrolling mechanism, touchscreen or arrow keys), to enter information into fields of the visual display (e.g., using a keypad), and/or to change the focus of the visual display from one field to another. Another type of user interface modality is a "voice modality," which may be implemented using a microphone, speaker, and associated hardware and software adapted to receive and digitize human speech, and/or to output audio information (e.g., audio prompts or other audio information). Other types of user interface modalities include, for example, gestural modalities, and pen modalities, to name just two.

In the interest of providing improved usability over "single-modality" devices, electronic devices may include a "multi-modal" user interface, which is a user interface that provides more than one user interface modality. For example, an electronic device may provide both a visual modality and a voice modality. Such a device may, for example, simultaneously output visual information (e.g., displayed information) and associated audio information (e.g., audio prompts), and/or the device may enable a user to input information via speech, a keypad or both, as the user desires. Generally, a device having a multi-modal user interface provides an improved user experience, because the user may choose the modality with which he or she will interact with the device. Interaction using a voice modality may be desirable, for example, in situations in which the user desires hands-free interaction, such as when typing is too time-consuming and/or when the user is impaired either permanently (e.g., due to arthritis or some other physical disability) or situationally (e.g., when the user is wearing gloves and/or when the user's hands are occupied with other tasks). In contrast, interaction using a visual modality may be desirable, for example, in situations in which complex information is to be rendered, when auditory privacy is desired, when noise restrictions exist, and/or when there are auditory constraints either permanently (e.g., when the user has a heavy accent, a speech impediment, and/or a hearing impairment) or situationally (e.g., when there is significant background noise or noise restrictions).

A multi-modal user interface may be implemented in conjunction with an application that operates in a networked environment (e.g., a client-server system environment). In such a case, the user interacts with the multi-modal user interface on a client device (e.g., a cellular telephone or computer), and the client device communicates with one or more other devices or platforms (e.g., a server) over a network. In such a networked environment, two basic techniques have been implemented to design client-server system elements that support a multi-modal user interface, and more particularly system elements that support a user interface adapted to provide at least visual and voice modalities. Using an "embedded" technique, substantially all of the requisite hardware and software associated with the multiple modalities are included in the client device itself. For example, the client device may include software and hardware adapted to perform audio-related tasks, such as speech processing, speech recognition, and/or speech synthesis, among other things. Generally, such audio-related tasks necessitate special processors or processing engines (e.g., digital signal processors) and substantial amounts of memory (e.g., for storing tables and software associated with the audio-related tasks). Using a "distributed" technique, some of the processing associated with one or more of the modalities may be shifted to another processing element, such as a remote server. For example, when a user speaks, audio data may be sent from the client device to a remote server, and the remote server may perform some or all of the audio-related tasks and return data, error messages, and/or processing results to the client device.

Each technique has its advantages and disadvantages. For example, an advantage to some conventional distributed techniques is that some of the computationally intensive processes associated with a multi-modal user interface (e.g., audio-related tasks) may be shifted out of the client device to another processing element (e.g., a remote server), as just mentioned. Accordingly, the client device may not include special processors or processing engines (e.g., digital signal processors) and extra memory for implementing the tasks that are displaced from the client device. This means that the client device may be designed in a more cost-effective manner (e.g., the device may be designed as a "thin" client) than client devices that implement an embedded technique.

However, using conventional distributed techniques, the states of the various modalities need to be synchronized between the client and the server. Consistent synchronization between the states of multiple modalities is difficult to achieve across a network. Implementation of a multi-modal user interface using conventional distributed techniques typically is performed using non-standard protocols, modified visual and speech application markup languages, and unconventional content authoring techniques. Accordingly, such techniques have not been readily embraced by application designers.

What are needed are multi-modal user interface methods and apparatus that may facilitate thin client designs and the use of standard protocols and conventional content authoring techniques. Other features and characteristics of the inventive subject matter will become apparent from the subsequent detailed description and the appended claims, taken in conjunction with the accompanying drawings and this background.

BRIEF DESCRIPTION OF THE DRAWINGS

The inventive subject matter will hereinafter be described in conjunction with the following drawing figures, wherein like numerals denote like elements.

DETAILED DESCRIPTION

Embodiments include methods and apparatus for implementing distributed multi-modal applications. These embodiments may facilitate the use of standard protocols and conventional content authoring techniques. In addition, these embodiments may be used in conjunction with "thin client" types of devices.

As used herein, the term "multi-modal" means adapted to implement multiple user interface modalities. The terms "distributed multi-modal application," "multi-modal application," and "distributed application" may be used interchangeably to mean a software application that provides a multi-modal user interface on a client device (e.g., client device 102, FIG. 1), and which includes distinct components that are executed in separate runtime environments on different platforms (e.g., client device 102, application server 104, and/or voice server 106, FIG. 1).

Figure 1:
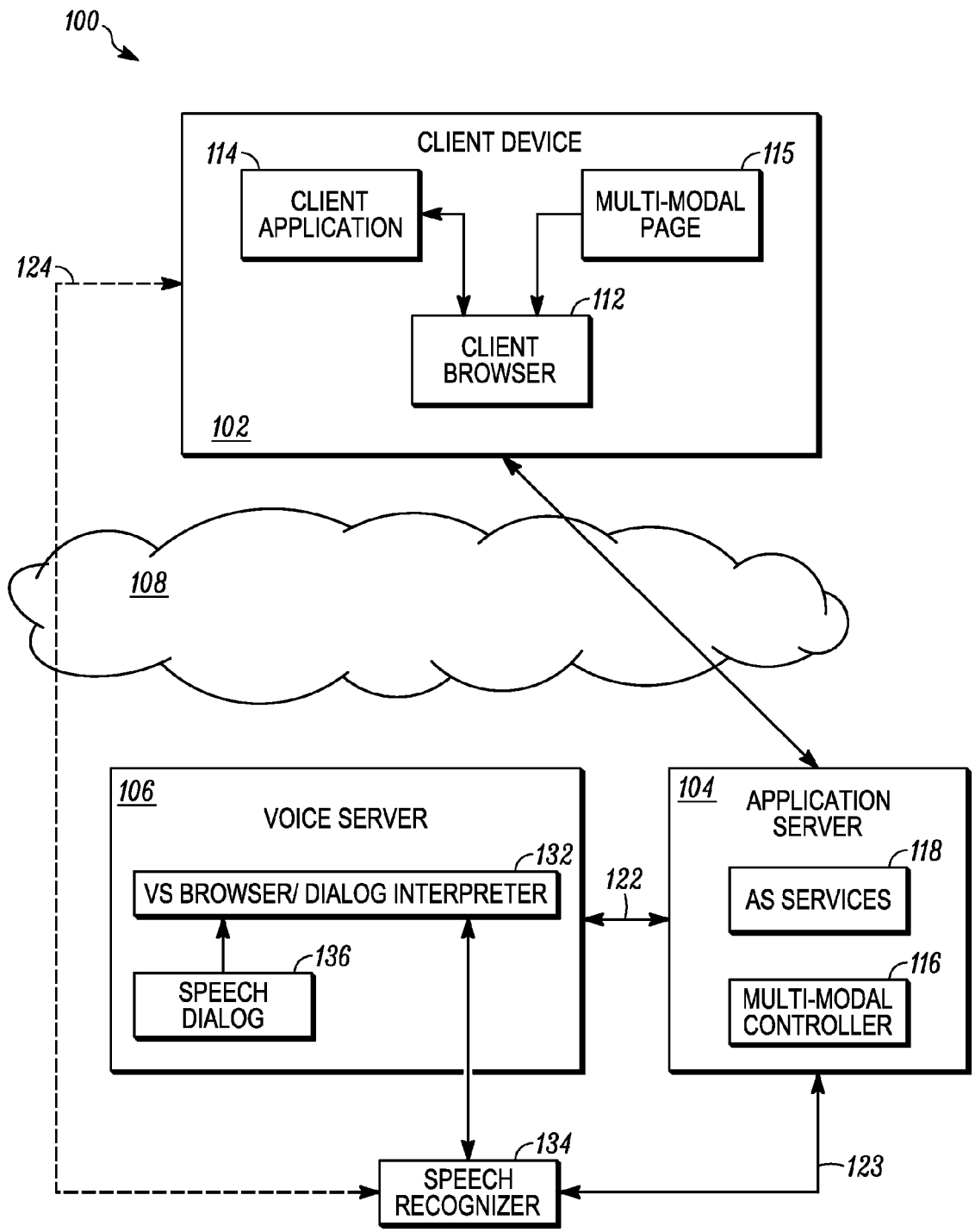
FIG. 1 is a simplified diagram of a system adapted to implement distributed multi-modal applications, in accordance with an example embodiment.

In an embodiment, distributed multi-modal applications are adapted to be executed in a system having a client-server system architecture (e.g., system 100, FIG. 1). As used herein, the terms "client" or "client device" may be used interchangeably to mean a processing entity, electronic device or application, which is adapted to execute software associated with a distributed multi-modal application. In addition, a client device is adapted to access, via a network, one or more services that are associated with the distributed multi-modal application, and that are provided by one or more remote servers.

The term "server" means a processing entity, electronic device or application that performs services for one or more network-connected clients or other servers in response to client-issued or server-issued requests. The terms "application server" and "AS" mean a server adapted to initiate establishment of data and control links associated with a distributed multi-modal application session, and to control synchronization between various "views" associated with the application session. The term "modality server" means a server adapted to execute a browser that is associated with one or more user interface modalities. The terms "voice server" and "VS" mean a modality server that is specifically adapted to execute a browser associated with a voice modality. Although the description, below, includes detailed descriptions of a system in which a voice server is included to support a voice modality, it is to be understood that other types of modality servers that support other types of user interface modalities additionally or alternatively may be included in a system, in other embodiments (e.g., a gestural modality, pen modality, and so on).

A particular example of a distributed multi-modal application will be used throughout this description in order to facilitate understanding of the example embodiments. It is to be understood that the illustrative example is not to be taken as limiting the scope of the embodiments only to that example. In the example embodiment, a distributed multi-modal application is adapted to support a visual modality and a voice modality. A client device includes a "multi-modal enabled" browser, which is adapted to interpret machine code that causes the client device to render a visual display that includes at least one display element for which input data is receivable by the client device though a visual modality and a voice modality. In an embodiment, the machine code is included within and/or referenced by a multi-modal page which, when interpreted, causes the client device to render multiple user-interactive display elements (e.g., data input fields for city, state, street number, and street name).

As used herein, the term "interpret" means to interpret and/or execute, as those terms are understood to those of skill in the art. The term "machine code," as used herein, means markup (e.g., markup drafted in standard generalized markup language (SGML), extensible markup language (XML), hypertext markup language (HTML), extensible HTML (XHTML), dynamic HTML (DHTML), VoiceXML, speech application language tags (SALT), XHTML+Voice (X+V), scalable vector graphics (SVG), and/or various other markup languages), scripts (e.g., JavaScript code), compiled code (e.g., compiled C/C++, Java, Lisp, Fortran, Pascal, and so on), and/or other information, which may be readily executed or interpreted by a computer processor (e.g., client device 102, application server 104, and/or voice server 106, FIG. 1).

Referring again to the example multi-modal application discussed herein, a user of the client device may enter information for a display element on which the application is currently "focused" (e.g., the element that is selected or in which the cursor is blinking), and/or may change the focus (e.g., by entering information for a display element and/or selecting another display element). In an embodiment, the user may enter information for a multi-modal display element using either a visual modality or a voice modality, as the user desires. When the user enters information using the keypad of the client device, for example, that action corresponds to entry of data using the visual modality, and the information will be rendered as text in the data entry field upon which the visual view is focused. Upon entering the information (e.g., by pressing "enter" or moving the cursor), the visual display may be updated to reflect a different focus.

Alternatively, the user may enter information using the voice modality (e.g., the user may speak a city name). When this occurs, the client device sends audio data representing the speech to a voice server, in an embodiment. The audio data may be sent indirectly through an application server, in an embodiment, or may be sent directly to the voice server, in another embodiment. The voice server is adapted to interface with a speech recognizer. In an embodiment, the voice server is further adapted to indicate, to the speech recognizer, which speech recognition resources (e.g., grammars, n-gram sequences, statistical language models or other resources) the speech recognizer should access to attempt to recognize speech based on the received audio data for a given display element. The voice server provides the speech recognition resource indications to the speech recognizer based on a voice browser's interpretation of a speech dialog that corresponds to the machine code (e.g., the multi-modal page) being interpreted by the client device.

The speech recognizer may generate a speech recognition result (or an error), which the voice server may convey to the client device via the application server, in an embodiment. The client device may then render the speech recognition result as text in the corresponding data field, and the focuses of the voice view and the visual view may be updated and synchronized, according to various embodiments. When the focuses of the voice view and the visual view are synchronized, the portion of the speech dialog being interpreted by the voice browser corresponds to the portion of the machine code being interpreted by the client device.

As will be described in detail below, embodiments include methods for synchronizing the visual view and the voice view in light of a user's ability to enter information using multiple modalities. This may be consistently achieved, in various embodiments, even though knowledge of the visual view focus is maintained on a client device, and knowledge of the voice view focus is maintained on a voice server. Synchronization may be achieved using standard protocols and conventional content authoring techniques, although in new ways, thus facilitating and encouraging the development of a wide variety of distributed multi-modal applications.

FIG. 1 is a simplified diagram of a system 100 adapted to implement distributed multi-modal applications, in accordance with an example embodiment. System 100 includes a plurality of system entities, which include at least one client device 102, application server 104 (AS), voice server 106 (VS), and speech recognizer 134 (SR), in an embodiment. As will be explained in detail below, various synchronous and asynchronous request/response protocols are observed by the system entities, in order to support the implementation of a distributed multi-modal application session within the system 100. As used herein, the term "multi-modal application session" may be defined as an instance of a distributed multi-modal application. In an embodiment, a multi-modal application session includes the interpretation (e.g., execution and/or interpretation) of machine code (e.g., machine code associated with a group of one or more related multi-modal pages 115) by a client device 102 in conjunction with the interpretation of a group of one or more corresponding speech dialogs by a voice server browser/dialog interpreter 132 executed by voice server 106.

Although only one client device 102 is illustrated, system 100 may include a plurality of similar or different types of client devices. For example, a client device 102 may form a portion of an electronic device selected from a group of devices that includes, but is not limited to, a cellular telephone, a radio, a pager, a personal data assistant (PDA), a personal navigation device (PND), a mobile computer system (e.g., an automotive or airplane computer system), a computer (e.g., a laptop, notebook or desktop computer), and a voice over internet protocol (VoIP) phone implemented on a computer, to name a few.

Client device 102 includes a processing subsystem and a data storage subsystem, and may be a portable or stationary electronic device. For either type of device, client device 102 may include a battery subsystem adapted to provide energy in the event that line power is not used to power client device 102. Client device 102 may be adapted to communicate over one or more networks 108 using various wired and/or wireless communication technologies. Accordingly, client device 102 may include either or both wired and wireless network interfaces. Client device 102 also may include a variety of user interface input devices (e.g., keypad, keys, dials, touchscreen, microphone, pointing device (e.g., mouse or touchpad), and stylus) and a variety of user interface output devices (e.g., display screen, speaker, audio output jack, headphones, earbuds, mechanical vibration device). In an embodiment, user interface devices associated with a visual modality include any one or more devices selected from a group of devices that includes a visual display, a touchscreen, a keypad, a key, a dial, a pointing device, and a stylus. User interface devices associated with a voice modality include any one or more devices selected from a group of devices that includes a microphone, a speaker, an audio output jack, headphones, and earbuds, in an embodiment.

In an embodiment, client device 102 is adapted to execute one or more instances of a client browser 112 and/or a client application 114. In an embodiment, client browser 112 is adapted to communicate with one or more servers (e.g., application server 104 and/or voice server 106) across network 108. More particularly, client browser 112 is adapted to access machine code (e.g., multi-modal page 115) on the client device 102, and further to interpret the machine code. In a particular embodiment, client browser 112 is adapted to access at least one multi-modal page 115, and to interpret the machine code (e.g., markup, scripts, and other information) within the multi-modal page 115.

As used herein, the term "multi-modal page" means an information set that represents at least one user-interactive display element that may be visually represented on client device 102, and for which a user may input information and/or indicate a selection through any of multiple modalities (e.g., a voice modality and a visual modality). Multi-modal page 115 may include, for example but not by way of limitation, a web page, a document, a file, a form, a list or another type of information set. When interpreted, multi-modal page 115 may cause client device 102 to render one or more user-interactive display elements. As used herein, a "user-interactive display element" may include, for example but not by way of limitation, a text entry field, a selectable element (e.g., a button or checkbox), and/or interactive text, among other things. Along with one or more user-interactive display elements, a multi-modal page may include other information and/or elements, as well, such as textual information, images (e.g., static or animated images), audio information, video, hyperlinks, metadata, and scripts, for example. As used herein, a "multi-modal display element" means a user-interactive display element for which input data may be received through more than one user interface modality.

In an embodiment, multi-modal page 115 includes markup, which may cause client browser 112 (or other syntactic analysis software) to execute one or more embedded or referenced scripts. A script may be embedded within multi-modal page 115 or the script may be referenced within multi-modal page 115, and client browser 112 may access the script from an external source (e.g., a server) or from local memory (e.g., from cache on the client device 102).

As will be described in detail later in conjunction with FIGS. 2-6, a script may be adapted to cause client device 102 to issue an asynchronous request to application server 104, and that asynchronous request may remain pending within application server 104 until voice server 106 notifies application server 104 that an event (e.g., a speech recognition event or voice view focus change) has occurred that may warrant an update to the visual display and/or visual view focus. At that time, application server 104 will issue a response to the asynchronous request. This protocol facilitates synchronization between the visual view focus on client device 102 and the voice view focus on voice server 106, as will be explained in more detail below. In an embodiment, the asynchronous requests are issued as asynchronous hypertext transfer protocol (HTTP) requests, and the responses are HTTP responses. A script may be adapted to cause client device 102 to issue synchronous requests, as well.

A multi-modal page 115 may be developed using AJAX (Asynchronous JavaScript and extensible markup language (XML)) techniques, and accordingly may include XML markup and JavaScript adapted to issue the asynchronous requests (e.g., asynchronous HTTP requests) referred to in the previous paragraph, and to process responses (e.g., HTTP responses) to those requests, in an embodiment. In other embodiments, a multi-modal page 115 may be developed using other types of programming, scripting, and/or markup languages that are adapted to issue asynchronous requests and to process responses to those requests.

As used herein, the term "markup language" means a defined set of syntax rules for information (e.g., markup or other machine code) that is embeddable within an information set (e.g., a multi-modal page 115 or other machine code), and which indicates, to a syntactic analysis software (e.g., client browser 112), the structure, layout, and/or other characteristics of display elements (e.g., text or other content) when the elements are rendered on an electronic device, among other things. For example, but not by way of limitation, markup associated with a markup language may include presentation markup, procedural markup, and/or descriptive markup (also referred to as "semantic" markup). Markup languages that may be used in various embodiments include, but are not limited to, SGML, XML, HTML, XHTML, DHTML, VoiceXML, SALT, X+V, SVG, and various other markup languages.

Client browser 112 includes a software program that is adapted to perform syntactic analysis of the machine code (e.g., markup) within a multi-modal page (e.g., multi-modal page 115) in a manner that enables client device 102 to render text, images, videos, music, and/or other information represented or referenced within the machine code. In various embodiments, client browser 112 may include, but is not limited to, an HTML/XHTML browser, a wireless application protocol (WAP) browser, a custom application, and/or a commercially-available browser (e.g., Internet Explorer, Mozilla Firefox, Safari, Opera, and Netscape, to name a few). In a particular embodiment, client browser 112 is an XHTML browser, which supports Ajax programming techniques, and which also has audio handling capabilities. Client browser 112 is "multi-modal enabled," in an embodiment, meaning that client browser 112 is equipped with a JavaScript engine or its functional equivalent for interpreting a multi-modal page (or other machine code adapted to render multi-modal display elements), and client browser 112 is adapted to support issuance of asynchronous requests and to interact with an HTTP server (e.g., application server 104). In addition, client browser 112 may be considered to be multi-modal enabled when client browser 112 is adapted to access an audio component that is capable of capturing user utterances (e.g., user speech), so that audio data representing those utterances may be transmitted. In an embodiment, the audio component also is capable of receiving and outputting (on an audio output device) audio prompts received from the network via the client browser 112. The audio component is accessible programmatically from the scripting environment of client browser 112, in an environment, so that the scripts downloaded or accessed by a multi-modal page enable the audio data path to be set up correctly, as will be described in more detail later.

Client application 114 includes a non-browser computer software application. In an embodiment, client application 114 is coded in a browser-supported language (e.g., SGML, XML, HTML, XHTML, DHTML, Flash, Java or other markup languages), and is reliant upon the client browser 112 to render the application executable. In other embodiments, client application 114 may not be reliant upon a client browser 112 to render the application executable (e.g., the client browser 112 may be excluded from system 100), and the client application 114 may itself implement the functionality of the client browser 112. For example, the client application 114 may be a compiled program adapted to render multi-modal display elements, and may be programmed using Ajax techniques to add a voice modality to the client device 102 as will be described in further detail below. In other words, in an embodiment in which the client application 114 includes the functionality of client browser 112, and client browser 112 is excluded, the client application 114 may be multi-modal enabled. A plurality of different types of client applications 114 may be developed, including for example, application components associated with mapping applications, navigation applications, and searching applications, to name a few.

Client device 102 may communicate with application server 104 over one or more networks 108. A network 108 may include, for example, a packet switched network and/or a circuit switched network, and may more particularly include one or more of the Internet, a personal area network (PAN), a local area network (LAN), a wide area network (WAN), a Wideband LAN (WLAN), a cellular telephone network, a radio network, a satellite communications network, a public switched telephone network (PSTN), and/or any of a variety of other types of networks adapted to enable the interchange of information between various system entities. Network 108 may be adapted to exchange information between the system entities using any of a variety of wired or wireless communications protocols.

Application server 104 (AS) is adapted to perform various AS services 118 for client device 102. For example, AS services 118 may include receiving multi-modal page requests from client device 102, and providing the multi-modal pages to client device 102 in response to the requests, among other things. In an embodiment, a multi-modal controller 116 is associated with the application server 104, and is provided within the same second-level domain as application server 104. Multi-modal controller 116 is adapted to facilitate synchronization between the data and focuses of the visual view and the voice view, as will be described in more detail below. Because the multi-modal controller 116 and the application server 104 are in the same second-level domain, in accordance with a conventional browser security model, the multi-modal controller 116 may be the target of any HTTP requests issued from client browser 112 based on interpretation of machine code within or referenced by a multi-modal page 115 that was provided to client device 102 by application server 104. Inclusion of multi-modal controller 116 within the box corresponding to application server 106 is not intended to imply that multi-modal controller 116 and application server 106 (or AS services 118) are executed on a same platform. Basically, application server 106 (or AS services 118) and multi-modal controller 116 should be physically and communicatively coupled in a manner that adheres to a security model imposed by client browser 112, in an embodiment.

In an embodiment, AS services 118 may include receiving requests for multi-modal pages and speech dialogs, fetching the multi-modal pages and speech dialogs, and sending them to the requesting entities. In contrast, in an embodiment, multi-modal controller 116 is adapted to facilitate synchronization of the focuses of the voice view and the visual view in the context of the multi-modal session. In addition, multi-modal controller 116 may be adapted to forward audio data received from the client device to the voice server, and vice versa. In an alternate embodiment, some or all of the functionality of multi-modal controller 116 may be implemented in AS services 118.

As mentioned previously, machine code associated with multi-modal pages rendered on client device 102 is adapted to issue requests (e.g., synchronous and/or asynchronous HTTP requests) to application server 104. Some of the requests directed to application server 102 may be processed by AS services 118, and other requests, which are more specifically directed to multi-modal controller 116 may be processed by multi-modal controller 116.

Multi-modal controller 116 is adapted to control the synchronization between the visual view data and focus maintained on client device 102 and the voice view data and focus maintained on voice server 106. Essentially, synchronization of the visual view focus and the voice view focus includes providing information to the client device 102 and voice server 106, which enable interpretation of machine code corresponding to a multi-modal page 115 on the client device 102 to be synchronized with interpretation of machine code for a corresponding speech dialog 136 on the voice server 106. Said another way, synchronization of the visual view focus and the voice view focus includes providing information to the client device 102 and to the voice server 106, which enables the execution state of the visual view on the client device 102 to be synchronized with the execution state of the voice view on the voice server 106. Synchronization of the voice view data and the visual view data includes providing the voice server with data corresponding to user inputs made via the visual modality, and providing the client device with data corresponding to speech recognition results. Embodiments of methods for performing this synchronization will be described in more detail later.

Voice server 106 is a modality server, which is particularly adapted to coordinate speech processing related tasks in conjunction with a distributed multi-modal application session. As mentioned previously, other types of modality servers may be incorporated into a system, in other embodiments. Voice server 106 is adapted to execute one or more instances of a VS browser/dialog interpreter 132 (referred to below as VS browser 132), and to interface with a speech recognizer 134.

VS browser 132, also referred to as a "voice browser" or "VB" herein, is a software program that enables voice server 106 to access and interpret speech dialogs (e.g., speech dialog 136), to send and receive audio data in conjunction with interpreting the speech dialogs, to issue asynchronous requests (e.g., HTTP requests), and to receive and process responses (e.g., HTTP responses) in the context of a multi-modal application session. In various embodiments, VS browser 132 may include, but is not limited to, a custom or commercially available browser or other application adapted to interpret markup associated with the provision of a voice modality (e.g., VoiceXML, SALT, X+V, and/or various other markup languages).

As mentioned previously, VS browser 132 may access and interpret a speech dialog 136. As used herein, a "speech dialog" may be interpreted to mean an information set associated with processing audio data, where portions of the speech dialog correspond to user-interactive display elements represented in a multi-modal page 115. A speech dialog may include machine code adapted to affect the processing of received audio data by speech recognizer 134 and/or to provide audio data (e.g., speech prompts) at appropriate times, according to various embodiments. A speech dialog may include, for example but not by way of limitation, a web page, a document, a file, a list or another type of information set. A speech dialog also may include other information and/or elements, such as textual information, metadata, machine code, and scripts, for example. Although embodiments described below include speech dialogs that are accessed (e.g., downloaded) by voice server 106, it is to be understood that, in other embodiments, a speech dialog may be realized as machine code that is resident on voice server 106, and that does not need to be downloaded or otherwise accessed.

In an embodiment, speech dialog 136 includes machine code, where the machine code may include compiled code, markup, and/or other information, which may be readily interpreted by the voice browser 132. In a particular embodiment, speech dialog 136 may include markup, which causes VS browser 132 to access and/or execute one or more embedded or referenced scripts (e.g., JavaScript code). A script may be embedded within speech dialog 136, or VS browser 132 may access a script from an external source (e.g., a server) or from local memory (e.g., from cache on the voice server 106). The scripts may include scripts adapted to cause VS browser 132 to call speech recognizer 134 to attempt to determine a speech recognition result based on received audio data, to retrieve or generate an audio prompt, and/or to issue requests (e.g., HTTP requests for speech dialogs or other types of requests), among other things. Speech dialog 136 may include markup (e.g., VoiceXML, X+V, and/or SALT markup) and JavaScript adapted to issue requests, in an embodiment. In other embodiments, speech dialog 136 may be developed using other types of programming languages, scripting languages, and/or markup languages.

Speech recognizer 134 is a software application that may be invoked by VS browser 132, and that is adapted to receive audio data (e.g., in compressed, uncompressed, encoded, unencoded or decoded format), to execute a speech recognition algorithm using the audio data in order to attempt to determine a speech recognition result (e.g., an indication of recognized speech), and to return the speech recognition result or to indicate that no result was determined (e.g., to indicate an error). As used herein, the term "audio data" means a digitized representation of speech or other audible sounds (generally "audio"), where the digitized audio representation may include sampled speech or other audible sounds in a compressed, uncompressed, encoded, unencoded, and/or decoded format. Audio data also may include pointers into tables or other data structures that include audio data, where the tables may be accessible to application server 102, voice server 106, and/or client device 102. In an embodiment, speech recognizer 134 may be executed in conjunction with various speech recognition resources (e.g., grammars, n-gram sequences, statistical language models, and/or other resources), which may be accessed based on the particular portion of the speech dialog 136 that is being interpreted (e.g., the current focus of the voice view).

In an embodiment, voice server 106 communicates with application server 104 via AS/VS communication path 122, and speech recognizer 134 communicates with application server 104 via AS/SR communication path 123. The communications between application server 104 and voice server 106 may include audio data (e.g., audio prompts) originating from voice server 106 and directed to client device 102 and speech recognition results determined by speech recognizer 134, among other things. The communications between application server 104 and speech recognizer 134 may include audio data received by application server 104 from client device 102, among other things. Voice server 106 also communicates with multi-modal controller 116 via a MMC/VS communication path. The communications between multi-modal controller 116 and voice server 106 may be performed using a voice browser control protocol (e.g., a standard protocol), which allows multi-modal controller 116 to instruct the voice server 106 regarding which speech dialog to download, which element to focus on, and the data that should be used to update elements. In an embodiment, multi-modal controller 116 may essentially bridge the voice browser control protocol to the asynchronous HTTP requests received by client browser 116, which requests will be described in detail later.

In an alternate embodiment, speech recognizer 134 and client device 102 may directly exchange audio data via a SR/client audio data path 124. An "SR/client audio data path" may be defined to mean any one or more paths through network 108 (or some other communication medium) along which audio data may be exchanged between an IP address and/or port associated with speech recognizer 134 and an IP address and/or port associated with client device 102. In an embodiment, audio data may be streamed over SR/client audio data path 124 using a packet-data communication protocol. Alternatively, audio data may be exchanged over SR/client audio path 124 using circuit-switched or push-to-talk (PTT) communication methods. In an embodiment, audio data is communicated over SR/client audio data path 124 using a version of the real-time transport protocol/real-time transport control protocol (RTP/RTCP), although other protocols may be implemented, in other embodiments (e.g., transmission control protocol (TCP) or others).

Application server 104 and voice server 106 are distinct from each other, in that application server 104 and voice server 106 perform distinct processes, and exchange control messages that affect the performance of those processes over AS/VS communication path 122. In an embodiment, application server 104 and voice server 106 may be implemented on physically distinct hardware, which may or may not be co-located. In another embodiment, application server 104 and voice server 106 may be implemented on at least partially shared hardware, although the various messages still are exchanged between the two servers through the AS/VS communication path 122, as described in detail below.

As mentioned previously, embodiments of the inventive subject matter are adapted to synchronize a visual view data and focus and a voice view data and focus associated with a distributed multi-modal application session. The focus of the "visual view" is maintained by client device 102, in conjunction with interpretation of a multi-modal page (e.g., multi-modal page 115), and the focus of the "voice view" is maintained by voice server 106, in conjunction with interpretation of a speech dialog (e.g., speech dialog 136) associated with the multi-modal page. The terms "visual view" and "visual view focus" may be defined to be the display element corresponding to the machine code included or accessed within a multi-modal page that a browser (e.g., client browser 112) currently is interpreting or is waiting to interpret. For example, the current visual view focus may correspond to machine code associated with a single display element that is highlighted, at which the cursor is blinking, or at which some other indication of focus is set. The terms "voice view" and "voice view focus" may be defined to be the display element corresponding to the machine code included or accessed within a speech dialog that a browser (e.g., VS browser 132) currently is executing or is waiting to execute. For example, the current voice view focus may correspond to machine code that causes the voice browser 132 to wait to receive audio data as input for a particular display element that is being rendered on client device 102.

Embodiments of methods for initiating and conducting a multi-modal application session now will be described in conjunction with FIGS. 2-6. These embodiments will be described in the context of an example of a specific type of distributed multi-modal application, in order to facilitate explanation and understanding of the various embodiments. The example application is a mapping application, which includes a client application that is adapted to cause elements represented within a multi-modal page to be rendered on the client device through interpretation by a multi-modal enabled client browser. In an alternate embodiment, a client browser may be adapted to interpret a multi-modal page without initiation from a client application (e.g., when the user directly initiates an instance of a client browser and causes the client browser to download and interpret a multi-modal page). In still another alternate embodiment, a client application may perform some or all of the client browser tasks, and/or the client application may include some or all of the machine code that otherwise would be included within a multi-modal page. Accordingly, various embodiments may be performed with or without a multi-modal page, a client application or a client browser. These embodiments are not discussed in detail herein, although it is to be understood that they fall within the scope of the inventive subject matter.

The example will include a client device displaying a multi-modal page in the form of a data input form, where the data input form includes multiple multi-modal display elements. Each display element includes a fillable data entry field (e.g., data entry fields for city, state, street number, street address), into which a user may enter address information for a target location using either or both a visual modality or a voice modality. Upon submitting the entered information, the system may provide mapping information that enables the client device to display a map that includes the target location. It is to be understood that embodiments may be used in conjunction with other types of distributed multi-modal applications, as well (e.g., searching and navigation applications, among others).

In the given example, the multiple modalities include a visual modality and a voice modality. On the client device, the visual modality may be implemented using a display screen and associated hardware and software for generating visual displays. The visual modality also may be implemented on the client device using a keypad and/or one or more other user interface input devices, which enable a user to make selections, input information, and/or take other actions (e.g., change focus) through interaction with the visual display and/or other user interface input devices. The voice modality may be implemented on the client device using a microphone, a speaker, and associated hardware and software adapted to receive and digitize human speech, and/or to output audio information.

In the given example, a user may interact with the visual modality of the user interface (e.g., the visual display) by viewing the visual display and entering information into fields of the visual display, indicating selections, or changing the visual view focus using the keypad or other input devices. In addition, the user may interact with the voice modality of the user interface by listening to audio prompts and/or speaking in order to provide information associated with display elements on which the focus of the visual view is set. It is to be understood that, in alternate embodiments, a distributed multi-modal application may be adapted to enable a different set of modalities than a visual modality and a voice modality.

Figure 2:
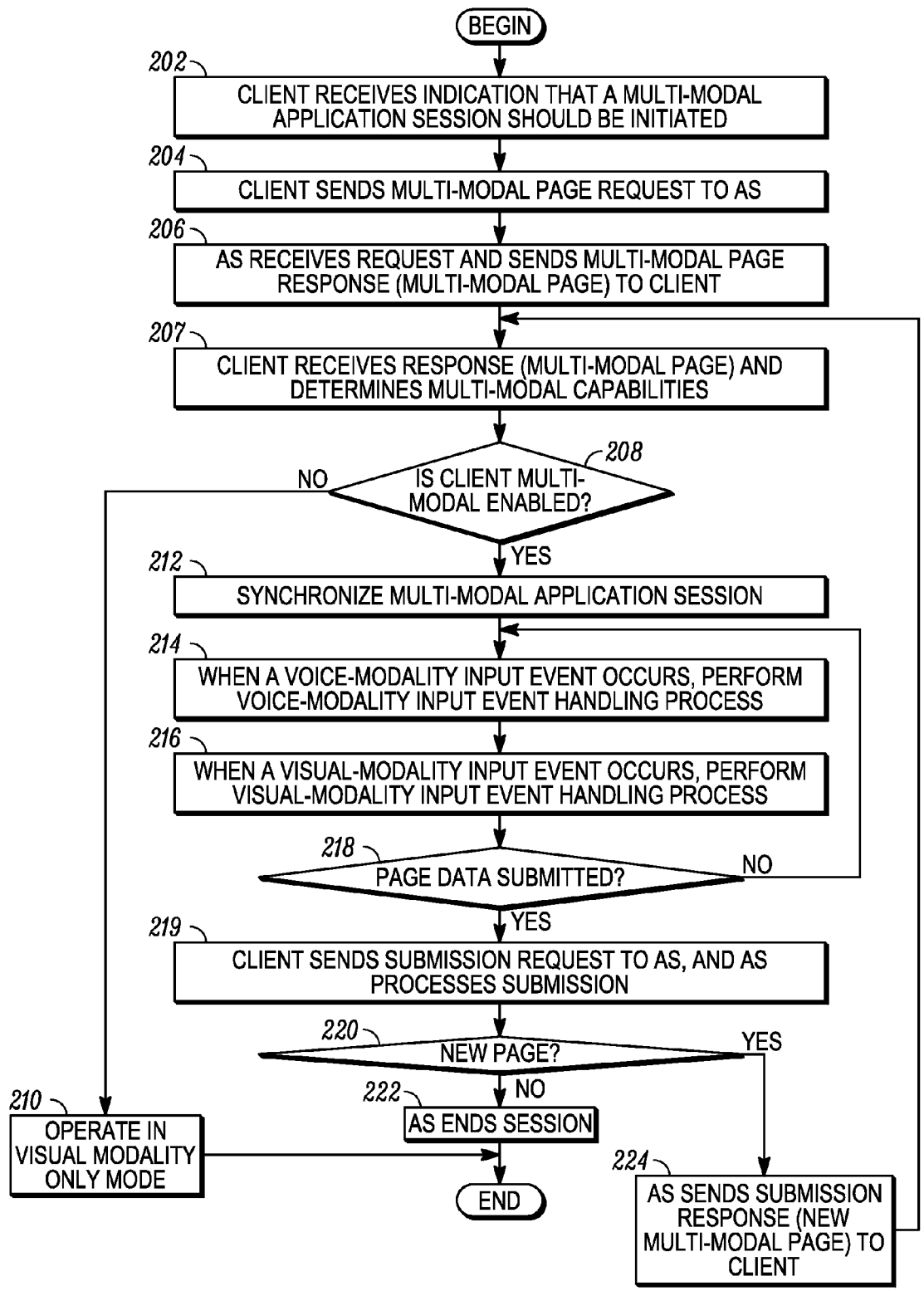
FIG. 2 is a flowchart of a method for initiating and conducting a multi-modal application session, in accordance with an example embodiment.

FIG. 2, which will be described below, illustrates an overall process for initiating and conducting a multi-modal application session, in accordance with an embodiment. The intention for FIG. 2 is not to limit the scope of the inventive subject matter, but instead to provide an overall context for understanding the more detailed process descriptions illustrated and described in conjunction with FIGS. 3, 5, and 6.

FIG. 2 is a flowchart of a method for initiating and conducting a multi-modal application session, in accordance with an example embodiment. The method may begin, in block 202, when a client device receives an indication that a multi-modal application session should be initiated. In various embodiments, a multi-modal application session may be initiated by an instance of a client application (e.g., a client-side portion of a mapping application) and/or a client browser. For example, a user of the client device may initiate an instance of a client application that is adapted to render, either by itself or in conjunction with a client browser, a visual display that includes at least one multi-modal display element for which data may be entered using a visual modality or a voice modality. Alternatively, the user may initiate an instance of a client browser, and may indicate, to the client browser, the user's desire for the browser to access or download a multi-modal page which, when interpreted, causes the client device to render the visual display. For example, the user may provide user inputs to navigate to a multi-modal page.

Upon the client device receiving an indication that a multi-modal application session should be initiated, the client device sends a multi-modal page request to the application server, in block 204. In an embodiment, the multi-modal page request is a synchronous HTTP request, which includes a reference (e.g., a uniform resource locator or URL) for the requested page. In block 206, the application server receives the request, fetches the requested multi-modal page, and sends the multi-modal page to the client device in the form of a multi-modal page response (i.e., a response to the multi-modal page request sent by the client device in block 204). In an embodiment, processing of the multi-modal page request is performed by an entity within the application server (e.g., AS services 118, FIG. 1) that is designated for fetching and returning multi-modal (or other) pages in response to client requests.

In block 207, the client device receives the multi-modal page response (e.g., the multi-modal page), and initiates interpretation of the markup and scripts included within and/or referenced by the multi-modal page. This includes making a determination, in block 208, of whether the client browser is multi-modal enabled. This determination may be made by evaluating configuration information pertaining to the client device and/or the client browser, for example. As discussed previously, a client browser may be considered to be multi-modal enabled when it is capable of capturing and transmitting detected user utterances (e.g., user speech), when it is equipped with a JavaScript engine or its functional equivalent for interpreting a multi-modal page (or other machine code adapted to render multi-modal display elements), when it is adapted to support issuance of asynchronous requests, and when it is adapted to interact with an HTTP server (e.g., application server 104, FIG. 1).

When a determination is made that the client browser is not multi-modal enabled, then the client device operates in a "visual modality only" mode, in block 210. In an embodiment, this includes the client device rendering the display elements represented in the multi-modal page, although the client device would limit its interpretation of the multi-modal page only to those portions associated with receiving user inputs via the visual modality (e.g., keypad entries). Essentially, those portions of the multi-modal page relating to receiving inputs via the voice modality are bypassed by the client browser. Further processing in accordance with conventional techniques may occur after the initial rendering of the page (e.g., processing of user inputs via the visual modality, visual modality focus changes, navigation to other pages, and so on). In addition, the client device may perform various other processes, such as processes analogous to the processes that are described later in conjunction with blocks 216, 218, 219, 220, and 224, except that those analogous processes would exclude steps relating to audio capture, speech recognition, synchronization of data and focus between the voice view and the visual view, and other processes relating to the voice modality. Because operation in a "visual modality only" mode is not an intended focus of the present application, such operation is not discussed in detail herein.

When a determination is made that the client browser is multi-modal enabled, then the multi-modal application session is synchronized, in block 212, through interaction between the client device, an application server (or more specifically a multi-modal controller), and a voice server/voice browser, as will be described in greater detail in conjunction with FIG. 3. Basically, synchronization of the multi-modal application session includes the client device requesting multi-modal session initiation from the application server, the application server providing a speech dialog corresponding to the multi-modal page to the voice server, the client device rendering one or more display elements represented in the multi-modal page on the visual display, and the client device issuing an asynchronous event request to the application server. In an embodiment in which the client device and the voice server exchange audio data directly (rather than through the application server), initiation of the multi-modal application session also may include the establishment of an audio data path (e.g., SR/client audio data path 124, FIG. 1) between the client device and the speech recognizer, over which audio data will be exchanged during the multi-modal application session. The multi-modal session synchronization process will be described in more detail later, in conjunction with the description of FIG. 3. In an embodiment, portions of the multi-modal session synchronization process that are performed by the application server may be performed by an entity associated with the application server (e.g., multi-modal controller 116, FIG. 1) that is designated to support synchronization between the visual view data and focus and the voice view data and focus.

As will be described in greater detail in conjunction with FIGS. 5 and 6, during the multi-modal application session, audio data will be exchanged between the client device and the voice server, and various HTTP requests and responses will be exchanged between the client device, the application server, and the voice server. Among other things, the various HTTP requests and responses enable synchronization between the visual view data and focus and the voice view data and focus to be maintained consistently throughout the multi-modal session.

Audio data and control information are exchanged between the various system entities in response to data input events associated with the voice modality and the visual modality, which events are referred to respectively as "voice-modality input events" and "visual-modality input events," respectively. Voice-modality input events and visual-modality input events may affect the voice view data and focus and/or the visual view data and focus. Voice-modality input events and visual-modality input events may occur at various times as the multi-modal application session is being conducted. As will be described in greater detail in conjunction with FIG. 5, when a voice-modality input event occurs, a voice-modality input event handling process is performed in block 214. In addition, as will be described in greater detail in conjunction with FIG. 6, when a visual-modality input event occurs, a visual-modality input event handling process is performed in block 216. Although blocks 214 and 216 are illustrated as occurring in sequence, these processes also may occur in parallel or in opposite sequence, and either or both process may occur multiple times while a multi-modal application session is being conducted. In an embodiment, portions of the voice-modality input handling process and the visual-modality input handling process that are performed by the application server may be performed by an entity associated with the application server (e.g., multi-modal controller 116, FIG. 1) that is designated to support synchronization between the visual view focus and the voice view focus.

Until page data (e.g., the cumulative data entered by the user for display elements of a rendered page) is submitted to the application server, as depicted by block 218, the processes of handling voice-modality input events and visual-modality input events continue to be performed, as illustrated in FIG. 2. Alternatively, the processes of handling voice-modality input events and visual-modality input events may be interrupted when the multi-modal application session is otherwise terminated (e.g., through user actions, communication failures, expirations of timeouts, or other events).

The client device may determine, in block 218, that page data is being submitted when the user has indicated such submission (e.g., by selecting a submit option or pressing a submit button), when the user has entered data into all user-interactive display elements, and/or when the user has entered data into a last user-interactive display element in the sequence of elements rendered on the visual display, for example. Page data may be submitted in other ways, as well, depending on the particular type of multi-modal page being rendered on the client device. For example, although the example of a fillable form is described in detail herein, a multi-modal page alternatively may include one or more speech modality enabled data input elements for which data may be submitted automatically upon the detection of a user utterance (e.g., the user utterance comprises the user indication of data submission). For example, the multi-modal page may be associated with a game or a graphic chart display, in which a user may cause aspects of the visual display to be modified via voice commands.

When the client device determines that page data is being submitted, the client device may send a submission request to the application server, in an embodiment, in block 219. The submission request may include representations of some or all of the input data that was rendered in conjunction with the multi-modal page interpretation, in an embodiment. If the markup within the multi-modal page currently being interpreted indicates that a new multi-modal page should be loaded, then the submission request also may include a reference (e.g., a URL) to the new multi-modal page, in an embodiment. In an alternate embodiment, the client device may instead send the multi-modal page reference in a separate multi-modal page request, rather than in the submission request. Upon receipt of the submission request, the application server may process the input data (e.g., update stored values).

A multi-modal application session may involve entering and submitting data for a single multi-modal page or for a sequence of multiple multi-modal pages. Accordingly, in block 220, the application server may determine whether the client device has requested a new multi-modal page (e.g., when the client device has provided a multi-modal page reference in the submission request or in a separate request). If not, then in block 222, the application server may end the multi-modal session, and the process may end. If so, then in block 224, the application server fetches the new multi-modal page, and sends the new multi-modal page to the client device in the form of a submission response. In an embodiment, fetching and providing the new multi-modal page may be performed by an entity within the application server (e.g., AS services 118, FIG. 1) that is designated for fetching and returning multi-modal (or other) pages in response to client requests. After sending the new multi-modal page to the client device, the method may then iterate as shown in FIG. 2, in an embodiment. More particularly, the client device may receive a multi-modal page response with the new multi-modal page, in block 208 (e.g., the "submission response" is the "multi-modal page response"). Because the client device previously made a determination of whether the client browser is multi-modal enabled, the client device may bypass that step and proceed directly to synchronizing the multi-modal application session in block 212. As will be apparent from the description of FIG. 3, certain portions of the session synchronization process also may be bypassed if a session already has been initiated. For example, the application server may bypass initiating a multi-modal session with the voice server, as will be described in conjunction with block 304 of FIG. 3.

Figure 3:
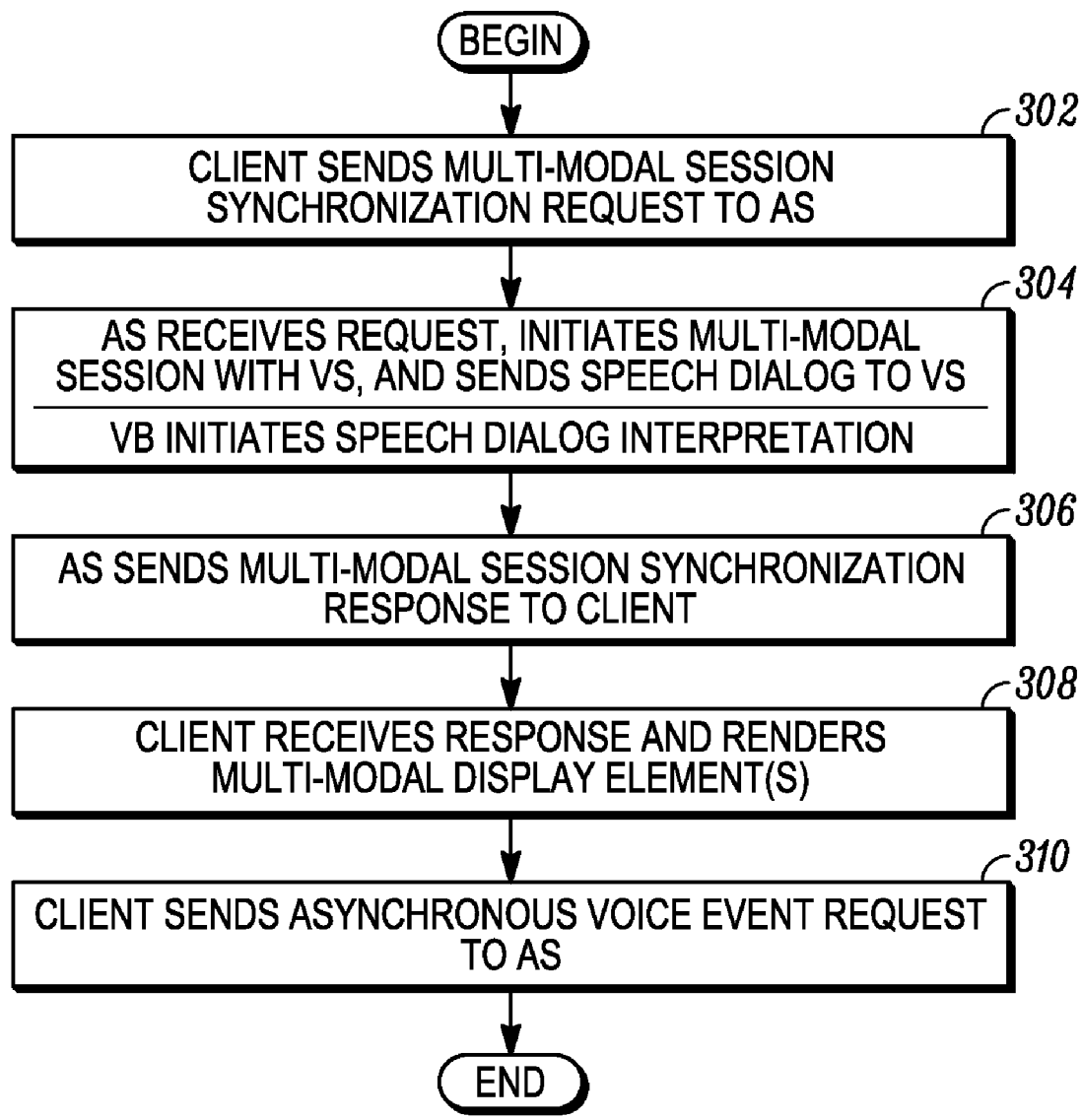
FIG. 3 is a flowchart of a method for performing multi-modal application session synchronization, in accordance with an example embodiment.

FIG. 3 is a flowchart of a method for performing multi-modal application session synchronization (e.g., process 212, FIG. 2), in accordance with an example embodiment. The method may begin, in an embodiment, when the client device sends a multi-modal session synchronization request to the application server, in block 302. The multi-modal application session synchronization request may be, for example, a synchronous HTTP request, which indicates, to the application server, that the client device is multi-modal enabled, and that the application server should proceed with synchronizing the multi-modal session. In an embodiment, the multi-modal application session synchronization request also may include a reference (e.g., a URL) for a speech dialog corresponding to the multi-modal page being interpreted on the client device. In addition, particularly when the speech dialog will be a first speech dialog associated with the multi-modal application session, the multi-modal application session synchronization request may include audio communication information for the client device. The audio communication information may include information that the application server may use during the multi-modal application session to send audio data to the client device (e.g., information describing the audio format(s), bitrate(s), and/or audio type(s) supported by the client device, desired audio codec(s), and/or audio address information such as the client device IP address and the port number to be used for audio data sent to the client device). In an alternate embodiment, the audio communication information may be provided in a message other than the multi-modal application session initiation request.

In block 304, the application server receives the multi-modal session initiation request and initiates a multi-modal session with the voice server, unless it already has done so in the context of a current multi-modal application session. This may include, for example, the application server exchanging audio communication information with the voice server, which will be used to transfer audio data between the application server and the voice server during the multi-modal application session (e.g., the audio format(s), bitrate(s), and/or audio type(s) supported by the application server and voice server, desired audio codec(s), and/or audio address information such as the application server IP address, the voice server IP address, and the port numbers to be used for audio data exchange).

In an alternate embodiment, as mentioned previously, the client device and the speech recognizer may exchange audio data directly. In such an embodiment, synchronization of the multi-modal application session may include establishing an audio data path between the client device and the speech recognizer (e.g., SR/client audio data path 124, FIG. 1). Although this process is not described in detail herein, the process may include the client device and the speech recognizer exchanging audio path information with each other, via the application server, which includes information describing the audio format(s), bitrate(s), and/or audio type(s) supported by the client device and speech recognizer, desired audio codec(s), and/or audio address information such as the client device IP address, the speech recognizer IP address, and the port numbers to be used for audio data exchange. The remaining description pertains to embodiments in which the client device and the speech recognizer exchange audio data through the application server. However, it is to be understood that the scope of the inventive subject matter embraces the alternate embodiments described in this paragraph.

Referring again to block 304, the application server may determine, from the multi-modal session synchronization request, a reference (e.g., the URL) for the speech dialog corresponding to the multi-modal page being interpreted on the client device. In an embodiment, the application server may then fetch the speech dialog and send it to the voice server. In an alternate embodiment, the application server may send the reference for the speech dialog to the voice server. The voice server may then download or access the speech dialog itself.

The voice browser may then initiate interpretation of the speech dialog. In an embodiment, this may include interpreting a portion of the speech dialog that corresponds to a multi-modal display element at which the client device will initially set its focus (e.g., the display element in which the cursor will be positioned when the client device initiates rendering of the multi-modal page). The multi-modal display element corresponding to the portion of the speech dialog currently being executed indicates the current focus of the voice view. The voice browser may instruct the speech recognizer regarding which speech recognition resources (e.g., grammars, n-gram sequences, statistical language models or other resources) it should use to attempt to recognize speech corresponding to the current focus of the voice view. In addition, the voice server may inform the application server that it has initiated interpretation of the speech dialog. In some cases, an audio prompt may be associated with the initial focus of the voice view. If so, then the voice server may send audio data to the application server, which represents the audio prompt.

In block 306, the application server may send a multi-modal session synchronization response to the client device (e.g., a response to the multi-modal session synchronization request that the client device sent to the application server in block 302). The multi-modal session synchronization response may indicate, to the client device, that the client device should proceed with its interpretation of the multi-modal page and the rendering of one or more multi-modal display elements represented within the multi-modal page. In addition, the multi-modal session synchronization response, may include audio communication information that the client device may use during the multi-modal application session to send audio data to the application server (e.g., information describing the audio format(s), bitrate(s), and/or audio type(s) supported by the application server, desired audio codec(s), and/or audio address information such as the application server IP address and the port number to be used for audio data sent to the application server). In an alternate embodiment, the audio communication information may be provided in a message other than the multi-modal application session synchronization response. If the voice server provided audio data corresponding to an audio prompt, the application server also may forward the audio data to the client device.

In block 308, the client device receives the multi-modal session synchronization response, and interprets that portion of the multi-modal page associated with initially displaying one or more multi-modal display elements on the client device. In an embodiment, this may include the client device rendering the multi-modal display elements on a display device associated with the client device. The client device also may render a cursor or other indication of the initial focus of the visual view. For example, the client device may render a cursor within a data entry field associated with a multi-modal display element. If the application server forwarded audio data (e.g., an audio prompt) to the client device, the client device also may output the audio data on a speaker or other audio output device associated with the client device.

Figure 4:
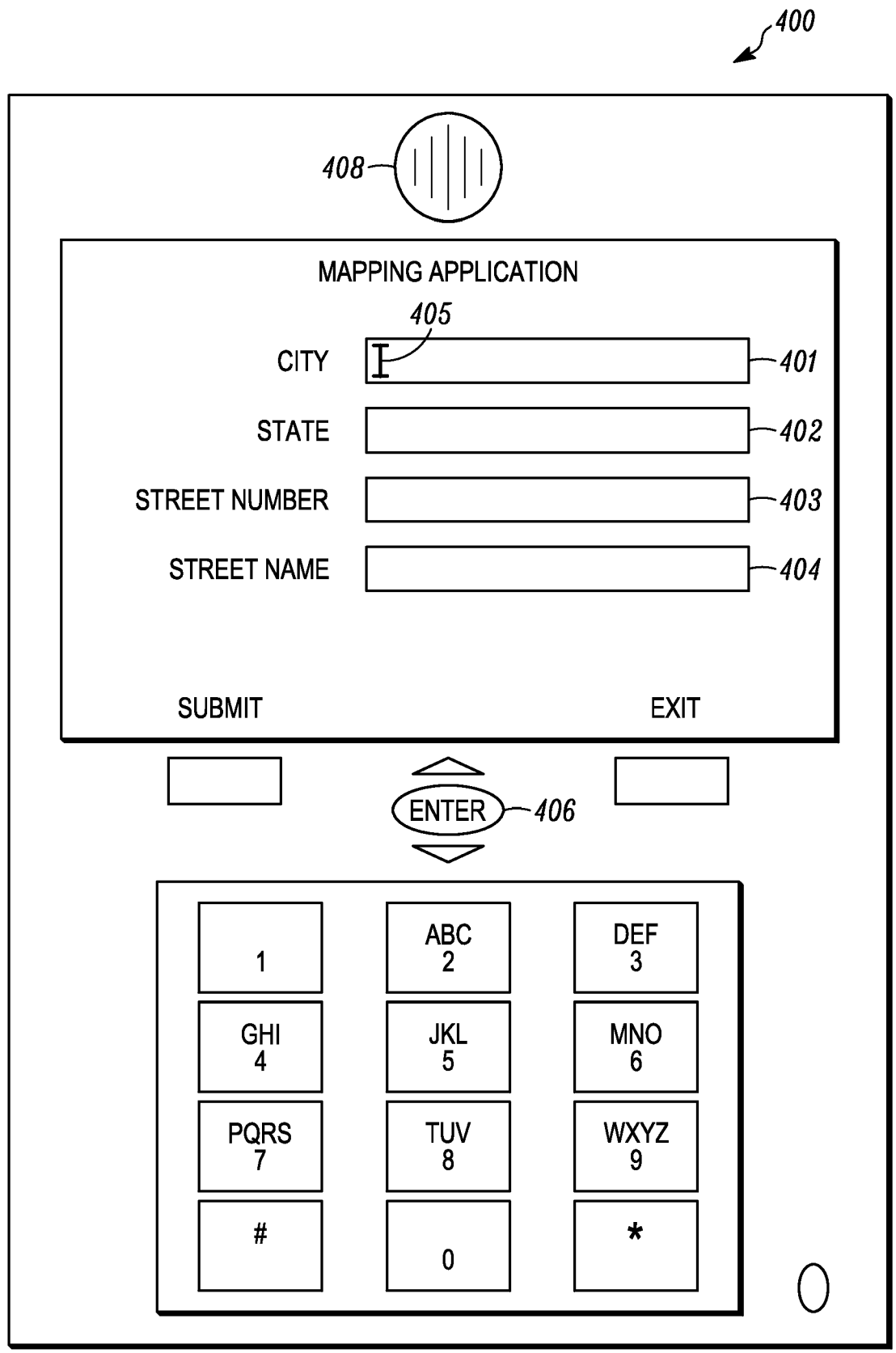
FIG. 4 is an example of a multi-modal page rendered on a client device, in accordance with an example embodiment.

FIG. 4 is an example of a multi-modal page rendered on a client device 400, in accordance with an example embodiment. In the illustrated example, a portion of the visual markup is rendered in the form of four multi-modal display elements 401, 402, 403, 404, each of which includes a textual label (e.g., "CITY", "STATE", "STREET NUMBER", and "STREET NAME") and a data entry field. In alternate embodiments, a particular multi-modal display element may be associated with multiple input data items, where a speech recognizer may access multiple speech recognition resources in attempting to generate recognition event(s) for the multiple input data items (e.g., a multi-modal display element may be associated with a "STREET ADDRESS", and the corresponding data entry field may be fillable with a street number and a street name). The initial focus of the visual view is indicated by the placement of cursor 405 within the data entry field 401. If audio data associated with an audio prompt has been sent to client device 400, client device 400 may output the audio data on speaker 408. For example, an initial audio prompt may say "Please input or say a city name."

Referring again to FIG. 3, in block 310, the client device sends an asynchronous voice event request (e.g., an asynchronous HTTP request) to the application server (e.g., to the multi-modal controller 116, FIG. 1), in an embodiment. The voice event request is received by the application server, and a TCP connection is established between the client device and the application server. In an embodiment, the voice event request remains pending at the application server (e.g., the TCP connection remains in existence) until a "voice event" occurs, at which time the application server may issue a voice event response to the client device. In various embodiments, a voice event may include the receipt, by the application server, of an indication from the voice server that a speech recognition result has been generated and/or that the focus of the voice view has changed to a new focus prior to the visual view focus being updated to the new focus. For example, the voice view may change to a new focus in advance of a focus change for the visual view when a speech recognition event occurs. As will be described in more detail in conjunction with FIG. 5, the pending voice event request facilitates synchronization between the visual view data and focus and the voice view data and focus when a voice event occurs.

As will be described in more detail below, the client device attempts to ensure that a voice event request is pending at the application server at substantially all times during the multi-modal session, in order to ensure that the application server may catch and return any voice events to the client device that may spontaneously occur. In an embodiment, the client device may not send another asynchronous voice event request to the application server until the application server has issued a voice event response to any previously-sent voice event request. Accordingly, only one voice event request (e.g., one TCP connection) may remain pending at the application server at any given time. In an alternate embodiment, the client device may send multiple (e.g., from two to five) asynchronous voice events to the server (e.g., in block 310 and/or block 514, FIG. 5) without waiting for a response to each one, which may result in multiple pending voice event requests at the application server, during all or a substantial portion of a multi-modal application session. In another alternate embodiment, the client device may periodically or occasionally re-issue a voice event request in order to attempt to avoid the possibility that the TCP connection is terminated prior to the application server issuing a response. For example, an application server may expire a pending voice event request if it remains pending for a period of time that exceeds a timeout period, or the TCP connection may be terminated for a variety of other reasons. In embodiments in which the client device may cause multiple voice event requests to become pending at the application server, the application server may manage the number of voice event requests that it allows to remain pending for that client device in order to manage the processing load placed on the application server.

Upon the client device sending an asynchronous voice event request (or multiple requests) to the application server in block 310, the method for initiating the multi-modal application session may then end. At this point, the visual view has an initial focus and the voice view has an initial focus. The initial focuses of the visual and voice views should be synchronized to correspond to portions of the multi-modal page and the speech dialog, respectively, that are associated with receiving user input and performing speech recognition for a particular multi-modal display element. At this point, the client device is waiting for a user input for the multi-modal display element via the visual modality or the voice modality.

As discussed previously in conjunction with blocks 216 and 218 of FIG. 2, after initiation of a multi-modal application session, at least two types of events may occur, which may affect the focuses of the voice view and the visual view. These event types include a voice-modality input event and a visual-modality input event. A voice-modality input event occurs when user inputs are received via the voice modality. For example, various voice-modality input events may include, but are not limited to, a speech recognition event and a voice view focus change, among other things. In contrast, a visual-modality input event occurs when user inputs are received via the visual modality. For example, various visual-modality input events may include, but are not limited to entry of data using the keyboard, keypad or touchscreen, and a visual view focus change, among other things. FIGS. 5 and 6 illustrate embodiments of a voice-modality input event handling process and a visual-modality input event handling process, respectively.

Figure 5:
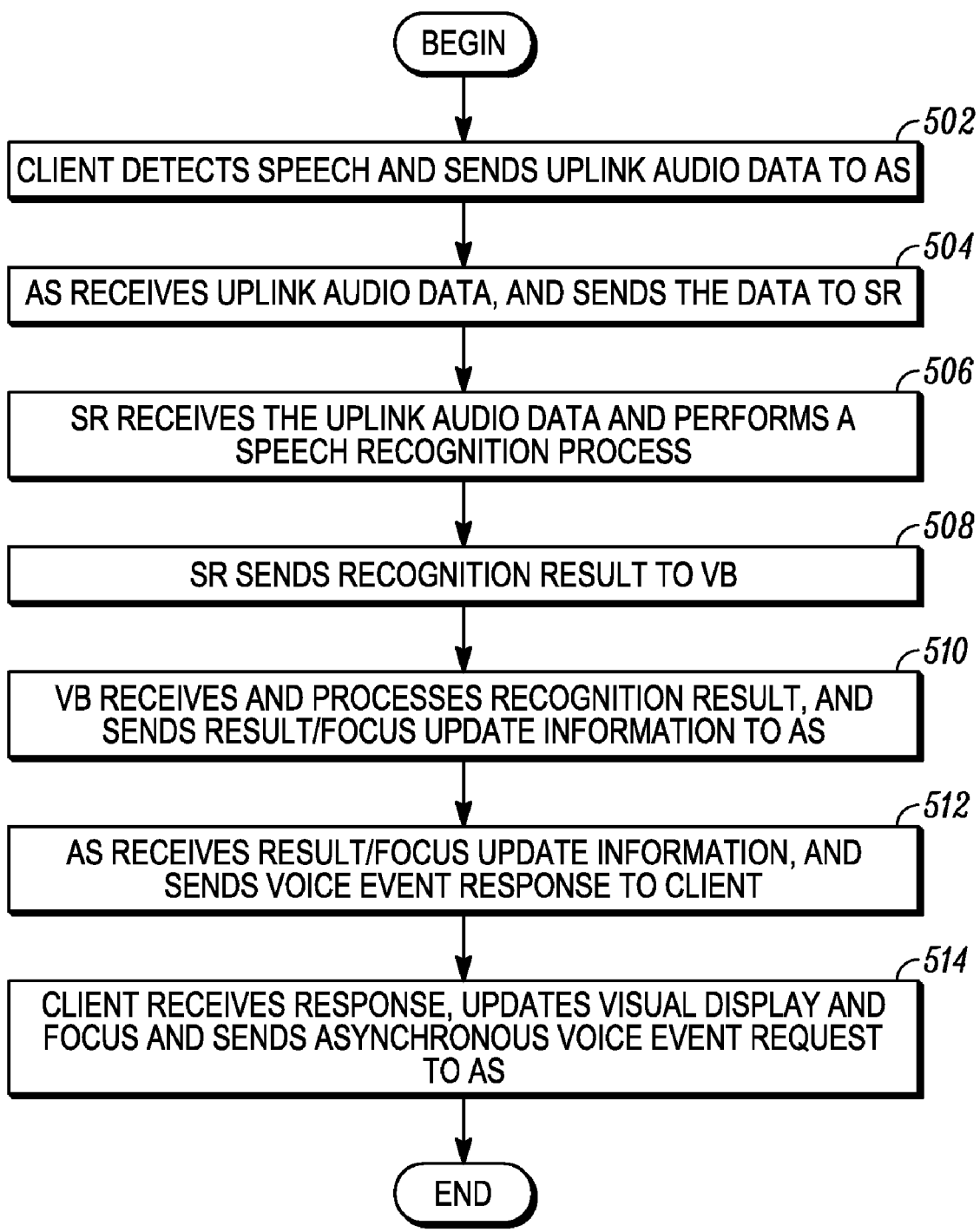
FIG. 5 is a flowchart of a method for performing a voice-modality input event handling process, in accordance with an example embodiment.

FIG. 5 is a flowchart of a method for performing a voice-modality input event handling process (e.g., process 214, FIG. 2), in accordance with an example embodiment. The method may begin, in block 502, when the client device receives, through its user interface, an audio signal that may represent a user utterance (e.g., user speech). The user speech may correspond to a single display element (e.g., the speech may be an utterance of "Chicago" corresponding to display element 401, FIG. 4) or to more than one display element (e.g., the speech may be an utterance of "Chicago, Ill." corresponding to display elements 401 and 402). Upon detection of a user utterance, the client device may digitize and process the audio signal to generate uplink audio data that represents the user utterance, and may send the uplink audio data to the application server. As used herein, "uplink audio data" refers to audio data sent from the client device to the speech recognizer (e.g., through the application server), and "downlink audio data" refers to audio data (e.g., voice prompts) sent from the voice server to the client device (e.g., though the application server).

In block 504, the application server receives the uplink audio data, and sends the uplink audio data to the speech recognizer. In the embodiment described in conjunction with blocks 502 and 504, uplink audio data is sent from the client device to the speech recognizer via the application server. In an alternate embodiment, as discussed previously, uplink audio data may be sent directly from the client device to the speech recognizer (e.g., over SR/client audio data path 124, FIG. 1). In such an embodiment, the processes of blocks 502 and 504 may be replaced by a process in which the client device sends the uplink audio data to the speech recognizer.

In block 506, the speech recognizer receives the uplink audio data and performs a speech recognition process. In an embodiment, the speech recognition process is performed using speech recognition resources that the speech recognizer has been instructed to use by the voice browser (e.g., in block 304, FIG. 3 or blocks 610, 620, FIG. 6), according to the current state of the voice view. When the speech recognizer determines that the uplink audio data corresponds to recognizable speech, the speech recognizer may generate a recognition result, in block 508, and may send the recognition result to the voice browser.

The voice browser receives and processes the recognition result, in block 510. In an embodiment, this may include transitioning the focus of the visual view. In other words, because a recognition result was generated for uplink audio data corresponding to a display element that was the current focus of the visual view, the voice browser may now transition to a new visual view focus that corresponds to another display element. Accordingly, the voice browser may discontinue its interpretation of the portion of the speech dialog associated with the current visual view focus, and may initiate interpretation of a portion of the speech dialog associated with the new visual view focus. In an embodiment, the voice browser may send update information to the application server, which may include the recognition result (e.g., the data for the display element) and an indication of the new visual view focus.

In block 512, the application server receives the result/focus update information, and sends a voice event response to the client device, in an embodiment. The voice event response is sent as a response to an asynchronous voice event request that was previously sent to the application server by the client device, and which currently is pending on the application server. In an embodiment, the voice event response may include the recognition result and an indication of the new focus of the voice view.

In block 514, the client device receives the voice event response. The client device may then update the visual view to reflect the result. For example, the client device may fill the display element that is the current focus of the visual view with text that represents the result. In addition, the client device may update the visual view focus to be synchronized with the new focus of the voice view. Accordingly, the visual view and the voice view will be synchronized.

In an embodiment, the client device sends another asynchronous voice event request (e.g., an asynchronous HTTP request) to the application server, as was previously described in conjunction with block 310 (FIG. 3). The voice event request is received by the application server. Preferably, the various synchronous and asynchronous HTTP requests will utilize connection caching, which will alleviate the need to tear down and re-establish new TCP connections for each request. However, in another embodiment, another TCP connection may be established between the client device and the application server for each HTTP request sent by the client device to the application server. In an embodiment, the voice event request will remain pending at the application server until another voice event occurs. The method of FIG. 5 may then end.

Figure 6:
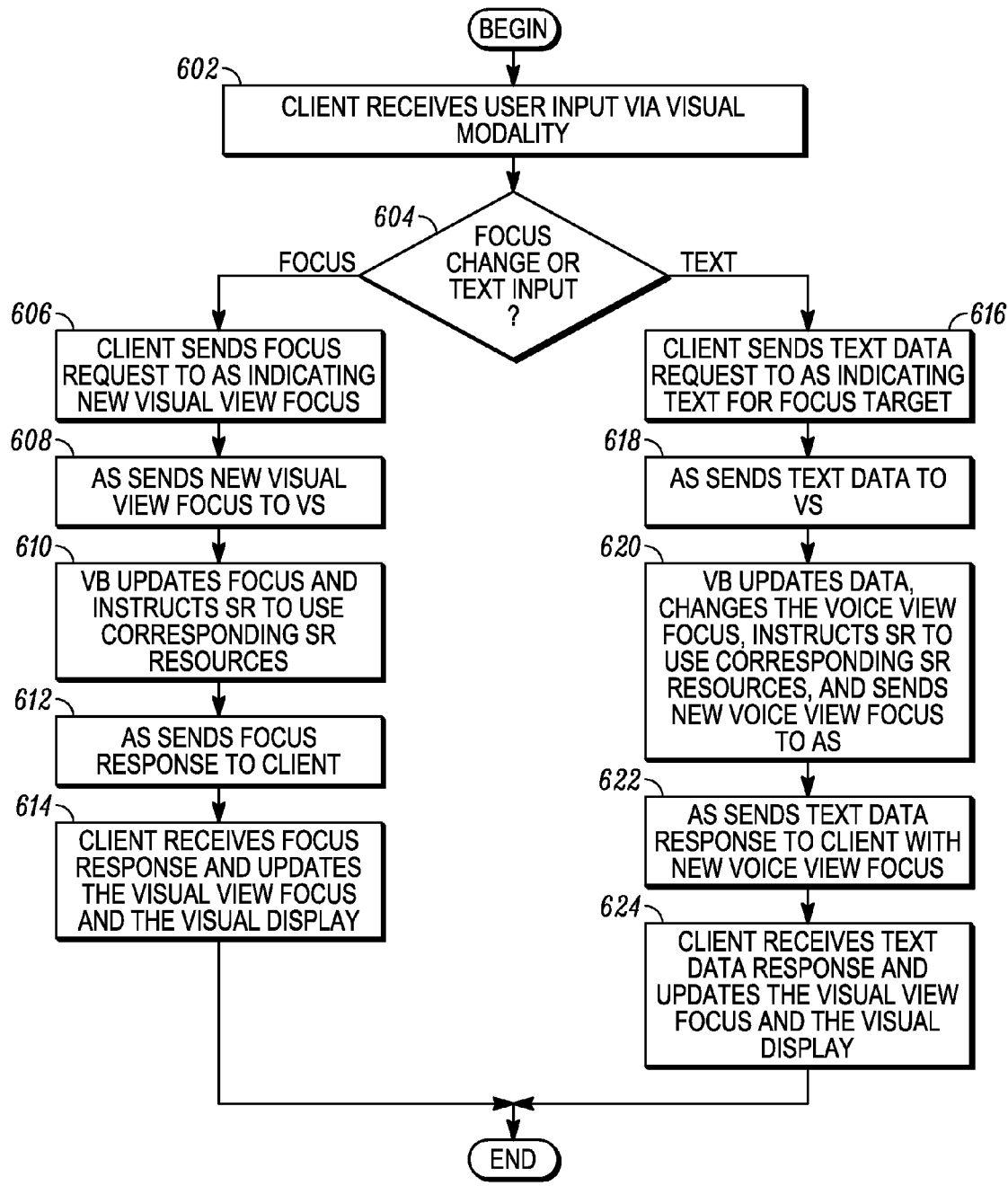
FIG. 6 is a flowchart of a method for performing a visual-modality input event handling process, in accordance with an example embodiment.

FIG. 6 is a flowchart of a method for performing a visual-modality input event handling process (e.g., process 216, FIG. 2), in accordance with an example embodiment. In an embodiment, the method may begin, in block 602, when the client device receives, through its visual modality, a user input that may warrant a focus change for the visual view and/or an update of the visual display. For example, the user may use a scrolling or pointing mechanism of the client device to select a display element and/or data entry field that is different from that upon which the visual view currently is focused. As another example, the user may enter text into the data entry field upon which the visual view is currently focused using the keypad, for example, and may indicate completion of information insertion into the data field, such as by pressing an "ENTER" key (e.g., "ENTER" key 406, FIG. 4) or by providing some other indication.

When the client device receives a user input that warrants a visual view focus change (without entry of text), as indicated by the left branch of decision block 604, the client device may send a focus request (e.g., a synchronous HTTP request) to the application server, in block 606. In an embodiment, the focus request may indicate the new focus of the visual view. In block 608, the application server sends an indication of the new focus of the visual view to the voice server.

In block 610, the voice server receives the indication of the new visual view focus. In response, the voice browser may update the voice view focus to be synchronized with the new visual view focus. In an embodiment, this may include the voice browser discontinuing interpretation of a portion of the speech dialog associated with the current voice view focus, and initiating interpretation of a portion of the speech dialog associated with the display element that is the new focus of the visual view. Accordingly, the visual view and the voice view will be synchronized. In addition, the voice browser may instruct the speech recognizer to use speech recognition resources associated with the new voice view focus.

In block 612, the application server may send a focus response to the client device (e.g., a response to the focus request sent by the client device to the application server in block 606). The client device receives the focus response, in block 614, and updates the visual view focus. In an embodiment, this may include the client browser discontinuing its interpretation of a portion of the multi-modal page associated with a current display element, and initiating interpretation of a portion of the multi-modal page associated with the display element corresponding to the new visual view focus. Accordingly, the visual view and the voice view will be synchronized. In addition, the client device may update the visual display to reflect the new visual view focus. For example, the client device may update the visual display to include the cursor in a data entry block corresponding to the display element that is the subject of the new visual view focus. The method may then end.

Referring back to decision block 604, when the client device receives a text user input, as indicated by the right branch of decision block 604, the client device may send a text data request (e.g., a synchronous HTTP request) to the application server, in block 616. In an embodiment, the text data request may include a representation of the text entered by the user. In block 618, the application server sends a representation of the text data to the voice server.

In block 620, the voice browser updates (e.g., stores) the representation of the text data, and determines a new focus of the voice view based on its interpretation of the voice dialog in light of the received text. In response, the voice browser may then update the voice view to the new voice view focus. In an embodiment, this may include the voice browser discontinuing interpretation of a portion of the speech dialog associated with the current voice view focus, and initiating interpretation of a portion of the speech dialog associated with the display element that is the new focus of the voice view. In addition, the voice browser may instruct the speech recognizer to use speech recognition resources associated with the new voice view focus, and may send an indication of the new voice view focus to the application server.

In block 622, the application server may send a text data response to the client device (e.g., a response to the text request sent by the client device to the application server in block 616). The text data response may include the indication of the new voice view focus. The client device receives the text data response, in block 624, and updates the visual view focus to be synchronized with the new voice view focus. In an embodiment, this may include the client browser discontinuing its interpretation of a portion of the multi-modal page associated with a current display element, and initiating interpretation of a portion of the multi-modal page associated with the display element corresponding to the new voice view focus. Accordingly, the visual view and the voice view will be synchronized. In addition, the client device may update the visual display to reflect the new visual view focus. For example, the client device may update the visual display to include the cursor in a data entry block corresponding to the display element that is the subject of the new visual view focus. The method may then end.

Various embodiments of methods and apparatus for implementing distributed multi-modal applications have now been described. The foregoing detailed description is merely exemplary in nature and is not intended to limit the inventive subject matter or the application and uses of the inventive subject matter to the described embodiments. Furthermore, there is no intention to be bound by any theory presented in the preceding background or detailed description.

An embodiment includes a method performed by a client device. The method includes the step of rendering a visual display that includes at least one multi-modal display element for which input data is receivable by the client device through a visual modality and a voice modality, where a visual view focus is set to a first multi-modal display element of the at least one multi-modal display element. The method also includes sending a first voice event request to an application server, where the first voice event request is an asynchronous HTTP request, receiving an audio signal that may represent a user utterance via the voice modality, sending uplink audio data representing the audio signal to a speech recognizer, receiving a voice event response from the application server in response to the voice event request, and sending a second voice event request to the application server in response to receiving the voice event response.

Another embodiment includes a method performed by an application server. The method includes the steps of receiving a first voice event request from a client device that has rendered a visual display that includes at least one multi-modal display element for which input data is receivable by the client device though a visual modality and a voice modality, where the first voice event request is an HTTP request. The method also includes receiving a speech recognition result from a voice server, where the speech recognition result represents a result of a speech recognition process performed on uplink audio data sent by the client device to a speech recognizer, sending a voice event response to the client device in response to the first voice event request, and receiving a second voice event request from the client device in response to sending the voice event response.

Yet another embodiment includes a system includes a client device adapted to render a visual display that includes at least one multi-modal display element for which input data is receivable by the client device though a visual modality and a voice modality, where a visual view focus is set to a first multi-modal display element of the at least one multi-modal display element. The client device is also adapted to send a first voice event request to an application server, where the first voice event request is an asynchronous HTTP request, receive an audio signal that may represent a user utterance via the voice modality, send uplink audio data representing the audio signal to a speech recognizer, receive a voice event response from the application server in response to the voice event request, and send a second voice event request to the application server in response to receiving the voice event response. In an embodiment, the system also includes the application server, which is adapted to receive the first voice event request from the client device, receive a speech recognition result from a voice server, where the speech recognition result represents a result of a speech recognition process performed on the uplink audio data sent by the client device to the speech recognizer, send the voice event response to the client device in response to the first voice event request, and receive the second voice event request from the client device in response to sending the voice event response.

The sequence of the text in any of the claims does not imply that process steps must be performed in a temporal or logical order according to such sequence unless it is specifically defined by the language of the claim. More specifically, the process steps of FIGS. 2, 3, 5, and 6 may be interchanged in any order, and/or may be performed in parallel, without departing from the scope of the inventive subject matter. In addition, it is to be understood that information within the various different messages (e.g., requests and responses), which are described above as being exchanged between the system elements, may be combined together into single messages, and/or the information within a particular message may be separated into multiple messages. Further, messages may be sent by system elements in sequences that are different from the sequences described above. Furthermore, words such as "connected" or "coupled to" used in describing a relationship between different elements do not imply that a direct physical connection must be made between these elements. For example, two elements may be connected to each other physically, electronically, logically, or in any other manner, through one or more additional elements, without departing from the scope of the inventive subject matter.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled technicians may implement the described functionality in varying ways for each particular application, but such implementation decisions should not be interpreted as causing a departure from the scope of the inventive subject matter.

The various illustrative logical blocks and modules described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in one or more software modules executed by a processor, or in a combination of the two. A software module may reside in random access memory, flash memory, read only memory (ROM), erasable programmable ROM (EPROM), electrical EPROM, registers, hard disk, a removable disk, a compact disc ROM (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter, it being understood that various changes may be made in the function and arrangement of elements described in an exemplary embodiment without departing from the scope of the inventive subject matter as set forth in the appended claims and their legal equivalents.

What is claimed is:

1. A method performed by a client device, the method comprising the steps of:
    rendering a visual display that includes at least one multi-modal display element for which input data is receivable by the client device through a visual modality and a voice modality, wherein the client device maintains knowledge of a visual view focus, which initially is set to a first multi-modal display element of the at least one multi-modal display element;

sending a first voice event request to an application server to establish a connection between the client device and the application server, wherein the first voice event request is an asynchronous hypertext transfer protocol (HTTP) request that will remain pending at the application server until a voice event occurs so that the connection remains established;

after sending the first voice event request, receiving an audio signal that may represent a user utterance via the voice modality;

sending uplink audio data representing the audio signal to a speech recognizer that interprets the uplink audio data based on a voice view focus, wherein the voice view focus initially is set to a portion of a speech dialog associated with the first multi-modal display element;

receiving a voice event response from the application server in response to the first voice event request and in response to the application server having received an indication that the voice event has occurred;

in response to receiving the voice event response, updating the visual view focus to a new visual view focus; and sending a second voice event request to the application server in response to receiving the voice event response, wherein the second voice event request will remain pending at the application server until a second voice event occurs.

2. The method of claim 1, wherein sending the uplink audio data to the speech recognizer comprises sending the uplink audio data to the application server to be forwarded to the speech recognizer.

3. The method of claim 1, wherein sending the uplink audio data to the speech recognizer comprises sending the uplink audio data directly to the speech recognizer.

4. The method of claim 1, further comprising:
receiving a speech recognition result; and
updating the visual display to display text corresponding to the speech recognition result in the first multi-modal display element.

5. The method of claim 1, further comprising:
receiving an indication of a new voice view focus; and
updating the visual view focus to be synchronized with the new voice view focus.

6. The method of claim 1, further comprising:
requesting a multi-modal page from the application server, wherein the multi-modal page, when interpreted, enables the client device to render the visual display;
receiving the multi-modal page from the application server;
determining whether the client device is multi-modal enabled; and
when the client device is multi-modal enabled, rendering the visual display.

7. The method of claim 1, further comprising:
receiving downlink audio data, wherein the downlink audio data includes an audio prompt; and
outputting the audio prompt on an audio output device of the client device.

8. The method of claim 1, further comprising:
receiving a user input to change the visual view focus to a second multi-modal display element of the at least one multi-modal display element;
based on receiving the user input, issuing a focus request to the application server indicating a new visual view focus corresponding to the second multi-modal display element;

receiving a focus response from the application server; and
updating the visual view focus and the visual display, in response to receiving the focus response, to indicate the second multi-modal display element as the visual view focus.

9. The method of claim 8, wherein receiving the user input comprises:
receiving an indication that the user has selected the second multi-modal display element using a pointing or scrolling user interface device.

10. The method of claim 8, wherein receiving the user input comprises:
receiving an indication that the user has entered text into a data entry field for the first multi-modal display element, wherein the focus request includes a representation of the text.

11. A method performed by an application server, the method comprising the steps of:
receiving, from a client device that has rendered a visual display that includes at least one multi-modal display element for which input data is receivable by the client device though a visual modality and a voice modality, a first voice event request to establish a connection between the client device and the application server, wherein the first voice event request is an asynchronous hypertext transfer protocol (HTTP) request that will remain pending at the application server until a voice event occurs so that the connection remains established;

after the first voice event request is received, receiving a speech recognition result from a voice server, wherein the speech recognition result represents a result of a speech recognition process performed on uplink audio data sent by the client device to a speech recognizer that interprets the uplink audio data based on a voice view focus, wherein the voice view focus initially is set to a portion of a speech dialog associated with a first multi-modal display element of the at least one multi-modal display element;

sending a voice event response to the client device in response to the first voice event request and in response to the application server having received the speech recognition result, wherein the voice event response causes the client device to update a visual view focus; and receiving a second voice event request from the client device in response to sending the voice event response, wherein the second voice event request will remain pending at the application server until a second voice event occurs.

12. The method of claim 11, further comprising:
receiving the uplink audio data from the client device; and
sending the uplink audio data to the speech recognizer.

13. The method of claim 11, wherein sending the voice event response to the client device comprises:
including the speech recognition result in the voice event response.

14. The method of claim 11, further comprising:
receiving an indication of a new voice view focus from the voice server; and
including the indication of the new voice view focus in the voice event response.

15. The method of claim 11, further comprising:
receiving an indication of a new visual view focus from the client device; and
sending the indication of the new visual view focus to the voice server.

16. A system comprising:

a client device adapted to render a visual display that includes at least one multi-modal display element for which input data is receivable by the client device though a visual modality and a voice modality, wherein the client device maintains knowledge of a visual view focus which initially is set to a first multi-modal display element of the at least one multi-modal display element, send a first voice event request to an application server to establish a connection between the client device and the application server before an audio signal is received via the voice modality, wherein the first voice event request is an asynchronous hypertext transfer protocol (HTTP) request that will remain pending at the application server until a voice event occurs so that the connection remains established, receive an audio signal that may represent a user utterance via the voice modality, send uplink audio data representing the audio signal to a speech recognizer that interprets the uplink audio data based on a voice view focus, wherein the voice view focus initially is set to a portion of a speech dialog associated with the first multi-modal display element, receive a voice event response from the application server in response to the first voice event request and in response to the application server having received an indication that the voice event has occurred, in response to receiving the voice event response, update the visual view focus to a new visual view focus, and send a second voice event request to the application server in response to receiving the voice event response, wherein the second voice event request will remain pending at the application server until a second voice event occurs.

17. The system of claim 16, further comprising:

the application server, wherein the application server is adapted to receive the first voice event request from the client device, receive a speech recognition result from a voice server, wherein the speech recognition result represents a result of a speech recognition process performed on the uplink audio data sent by the client device to the speech recognizer, send the voice event response to the client device in response to the first voice event request, and receive the second voice event request from the client device in response to sending the voice event response.

18. The system of claim 16, wherein the client device is further adapted to send the uplink audio data to the application server to be forwarded to the speech recognizer.

19. The system of claim 16, wherein the client device is further adapted to receive an indication of a new voice view focus, and to update the visual view focus to be synchronized with the new voice view focus.

20. The system of claim 16, wherein the client device is further adapted to receive a user input to change the visual view focus to a second multi-modal display element of the at least one multi-modal display element, and based on receiving the user input, to issue a focus request to the application server indicating a new visual view focus corresponding to the second multi-modal display element, to receive a focus response from the application server, and to update the visual view focus and the visual display, in response to receiving the focus response, to indicate the second multi-modal display element as the visual view focus.

21. The system of claim 16, wherein the client device is a device selected from a group of devices that includes a cellular telephone, a radio, a pager, a personal data assistant, a personal navigation device, a mobile computer system, an automotive computer system, an airplane computer system, a computer, a laptop computer, a notebook computer, a desktop computer, and a voice over internet protocol (VoIP) phone implemented on a computer.

* * * * *